US008164750B2

(12) United States Patent
Shimazu et al.

(10) Patent No.: US 8,164,750 B2

(45) Date of Patent: Apr. 24, 2012

(54) METHOD AND APPARATUS FOR DETECTING COLORED FOREIGN PARTICLES IN QUARTZ POWDER MATERIAL

(75) Inventors: Atsushi Shimazu, Akita (JP); Masaki Morikawa, Akita (JP)

(73) Assignee: Japan Super Quartz Corporation, Akita-shi (JP)

( * ) Notice: Subject to any disclaimer, the term of this patent is extended or adjusted under 35 U.S.C. 154(b) by 254 days.

(21) Appl. No.: 12/639,720

(22) Filed: Dec. 16, 2009

(65) Prior Publication Data

US 2010/0165347 A1 Jul. 1, 2010

(30) Foreign Application Priority Data

Dec. 26, 2008 (JP) ................................ 2008-332950

(51) Int. Cl.
*G01J 3/46* (2006.01)
*G01J 3/45* (2006.01)

(52) U.S. Cl. ......... 356/338; 356/456; 356/402; 209/580

(58) Field of Classification Search .......... 356/335–342, 356/456, 402, 237.1–237.3; 209/580, 643, 209/938; 382/110, 156

See application file for complete search history.

(56) References Cited

U.S. PATENT DOCUMENTS 5,085,325 A * 2/1992 Jones et al. .................. 209/580
5,129,268 A * 7/1992 Uesugi et al. ............... 73/865.5
5,245,188 A * 9/1993 Satake et al. ............... 250/341.7
5,638,961 A * 6/1997 Satake et al. .................. 209/580
5,659,624 A * 8/1997 Fazzari et al. ................ 382/110
5,703,784 A * 12/1997 Pearson ........................ 700/223
5,779,058 A * 7/1998 Satake et al. .................. 209/581
5,818,577 A 10/1998 Duclos
5,917,927 A * 6/1999 Satake et al. .................. 382/110
5,994,656 A * 11/1999 Satake et al. .................. 209/580
6,303,143 B1 * 10/2001 Chrai et al. ................... 424/451
7,830,530 B2 * 11/2010 Jonasson Bjarang ......... 356/601
2007/0019976 A1 * 1/2007 Watanabe et al. ............... 399/49
2008/0303777 A1 * 12/2008 Inoue et al. ................... 345/102
2010/0165619 A1 7/2010 Kawato

FOREIGN PATENT DOCUMENTS

JP 2000-84496 A 3/2000
JP 2000-143256 A 5/2000
JP 2001-264256 A 9/2001
JP 2003-287503 A 10/2003
KR 10-2008-0021043 A 3/2008

OTHER PUBLICATIONS

Extended European Search Report mailed Apr. 9, 2010, issued in corresponding European Application No. 09180787.5, 5 pages.

Office Action mailed Aug. 9, 2011, issued in corresponding Korean Application No. 10-2009-0126053, filed Dec. 17, 2009, 8 pages.

* cited by examiner

*Primary Examiner* — Sang Nguyen

(74) *Attorney, Agent, or Firm* — Christensen O'Connor Johnston Kindness PLLC

(57) ABSTRACT

Colored foreign particles contained in quartz powder material are detected in a high precision with the specified detection apparatus even when the colored foreign particles are pale colored foreign particles such as iron-based refuse, organic refuse and carbon-based refuse.

9 Claims, 3 Drawing Sheets

METHOD AND APPARATUS FOR DETECTING COLORED FOREIGN PARTICLES IN QUARTZ POWDER MATERIAL

BACKGROUND OF THE INVENTION

1. Field of the Invention

This invention relates to a method and an apparatus for detecting colored foreign particles in quartz powder material, and particularly to a method and an apparatus wherein pale colored foreign particles such as iron-based refuse, organic refuse and carbon-based refuse can be detected in a high precision and removed even if these colored foreign particles are contained in white quartz powder material having polygonal external surfaces and tending to reflect light diffusely.

2. Description of the Related Art

As the conventional method of removing foreign particles contained in powder material is mentioned a method wherein powder material existing on a conveyor made of white light-transmissive material is simultaneously irradiated in an inspection unit with a light transmitted from the lower side of the conveyor and with a light reflected on the upper side thereof so as to detect foreign particles with a line CCD camera located above the conveyor as described, for example, in JP-A-2000-84496.

As the conventional detection means for detecting colored foreign particles contained in white powder material is useful a method that a monochrome image of powder material conveyed, for example, on a conveyor is shot with a differential interference microscope and a spatial filter is applied to the shot monochrome image to emphasize a section of changing luminance and thereafter the emphasized section is binarized to detect the colored foreign particles contained in the white powder material.

According to such a method, however, the colored foreign particles can be effectively detected when a shading difference between white powder and the colored foreign particles is large, while there is a problem that when color of the colored foreign particles is pale like light yellow, pale colored foreign particles contained in white powder material cannot be detected sufficiently.

As a detection means for clarifying the shading difference is useful a method that powder material on a conveyor is irradiated in an inspection unit with a light from the upper side of the conveyor and shot with a line CCD camera located above the conveyor so as to process a shot image as a colored image to thereby detect colored foreign particles.

Since this detecting means for the colored foreign particles detects colored foreign particles as color images, even when color of the colored foreign particles is pale like light yellow, the shading of the colored foreign particles is distinguished from white powder material having no polygonal external surface such as powdery or granular medicine, and it is possible in principle to detect the particles in a high precision.

However, when the white powder material is quartz powder material, there is the following problem. Since the quartz powder material has polygonal, glassy external surfaces and tends to reflect light irradiated on the external surfaces of the quartz powder material diffusely, when the quartz powder material existing on a conveyor is irradiated in an inspection unit with a light from the upper side of the conveyor to shoot an image thereof with a line CCD camera located above the conveyor, a part of the quartz powder material is looked black or the like due to the influence of the above diffuse reflection, and hence the color image with accurate shading cannot be obtained, and especially pale colored foreign particles such as iron-based refuse, organic refuse and carbon-based refuse contained in the quartz powder material cannot be detected in a high precision.

SUMMARY OF THE INVENTION

It is, therefore, an object of the invention to provide a method and an apparatus for detecting colored foreign particles contained in quartz powder in a high precision wherein colored foreign particles contained in the quartz powder material, particularly pale colored foreign particles such as iron-based refuse, organic refuse and carbon-based refuse can be detected in a high precision by preventing diffuse reflection of irradiated light to obtain a color image with accurate shading.

In order to achieve the above object, the summary and construction of the invention zones follows:

(1) An apparatus for detecting colored foreign particles in quartz powder material comprising a material supplying means for continuously supplying white quartz powder material having polygonal external surfaces at a given rate;

a belt conveying means for conveying the quartz powder material continuously supplied from the material supplying means;

a first light emitting means located above the belt conveying means and emitting light with a given wavelength;

a light diffusing means located below the first light emitting means and above the belt conveying means and converting the light emitted from the first light emitting means into scattering light to irradiate the quartz powder material conveyed on the belt conveying means; and a color imaging means located above the belt conveying means and continuously shooting color images of the quartz powder material, wherein the quartz powder material is irradiated with the scattering light from the light diffusing means to clarify shading of color images shot by the color imaging means to thereby detect colored foreign particles contained in the quartz powder material.

(2) The apparatus for detecting colored foreign particles in quartz powder material according to the item (1), wherein the light diffusing means comprises a transparent plastic plate having a corrugated bottom surface.

(3) The apparatus for detecting colored foreign particles in quartz powder material according to the item (1), wherein the light emitted from the light emitting means is visible light having a wavelength of 20 to 800 nm.

(4) The apparatus for detecting colored foreign particles in quartz powder material according to the item (1), wherein the belt conveying means is made from a white light-transmissive material.

(5) The apparatus for detecting colored foreign particles in quartz powder material according to the item (1), further comprising a second light emitting means for irradiating the quartz powder material conveyed on the belt conveying means with light from the lower side of the belt conveying means.

(6) The apparatus for detecting colored foreign particles in quartz powder material according to the item (1), further comprising a means that a monochrome image of the quartz powder material conveyed on the belt conveying means is shot with a differential interference microscope and a spatial filter is applied to the shot monochrome image to emphasize a section of changing luminance and the emphasized section is binarized to detect colored foreign particles contained in the quartz powder material.

(7) The apparatus for detecting colored foreign particles in quartz powder material according to the item (1), wherein quartz powder in the quartz powder material has an average particle size of 20 to 1000 μm.

(8) The apparatus for detecting colored foreign particles in quartz powder material according to the item (1), wherein the colored foreign particles in the quartz powder material are pale colored foreign particles such as iron-based refuse, organic refuse and carbon-based refuse.

(9) The apparatus for detecting colored foreign particles in quartz powder material according to the item (1), wherein the foreign particles in the quartz powder material have an average particle size of 20 to 1000 μm.

(10) A method for detecting colored foreign particles in quartz powder material, which comprises conveying white quartz powder material having polygonal external surfaces, irradiating the conveyed quartz powder material at least from above thereof with scattering light converted from light of a given wavelength and continuously shooting color images of the quartz powder material with clarified shading to thereby detect colored foreign particles contained in the quartz powder material.

According to the invention, it is possible to detect colored foreign particles in a high precision even when colored foreign particles, particularly pale colored foreign particles such as iron-based refuse, organic refuse and carbon-based refuse are contained in quartz powder material.

BRIEF DESCRIPTION OF THE DRAWING

The invention will be described with reference to the accompanying drawings, wherein.

DESCRIPTION OF THE PREFERRED EMBODIMENTS

Figure 1:
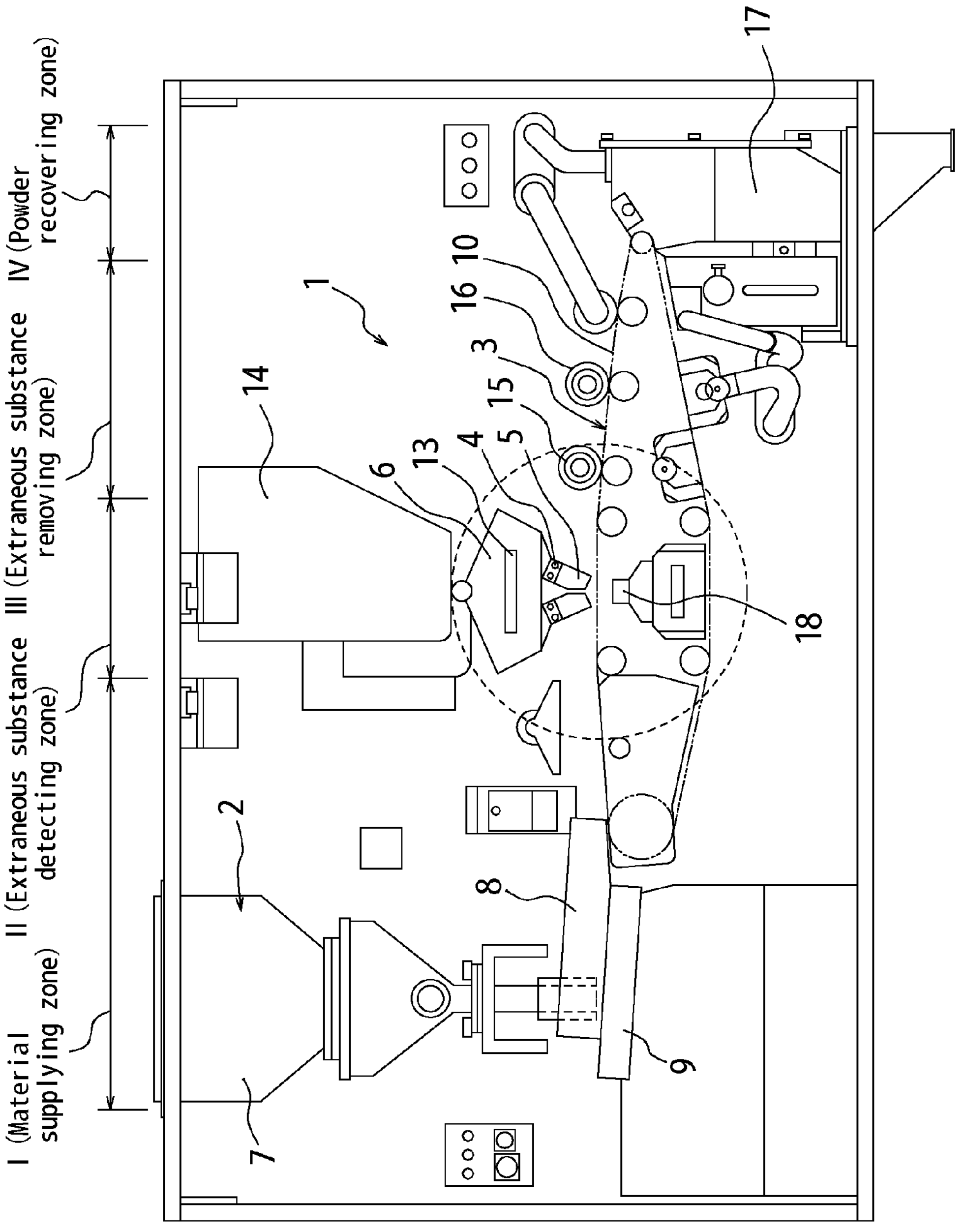
FIG. 1 is a schematic side view of an apparatus for detecting colored foreign particles in quartz powder material according to the invention.
Figure 2:
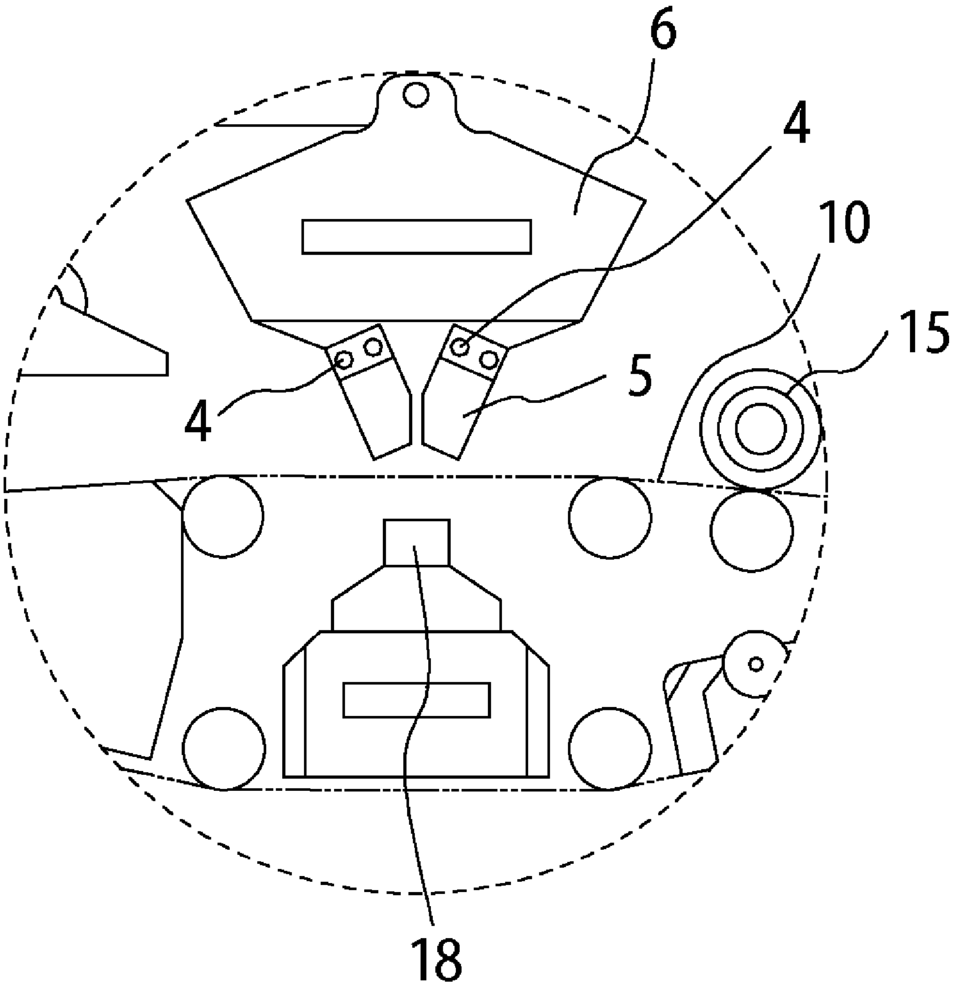
FIG. 2 is a partial enlarged view of a section surrounded by a dashed circle in the detection apparatus of FIG. 1.
Figure 3:
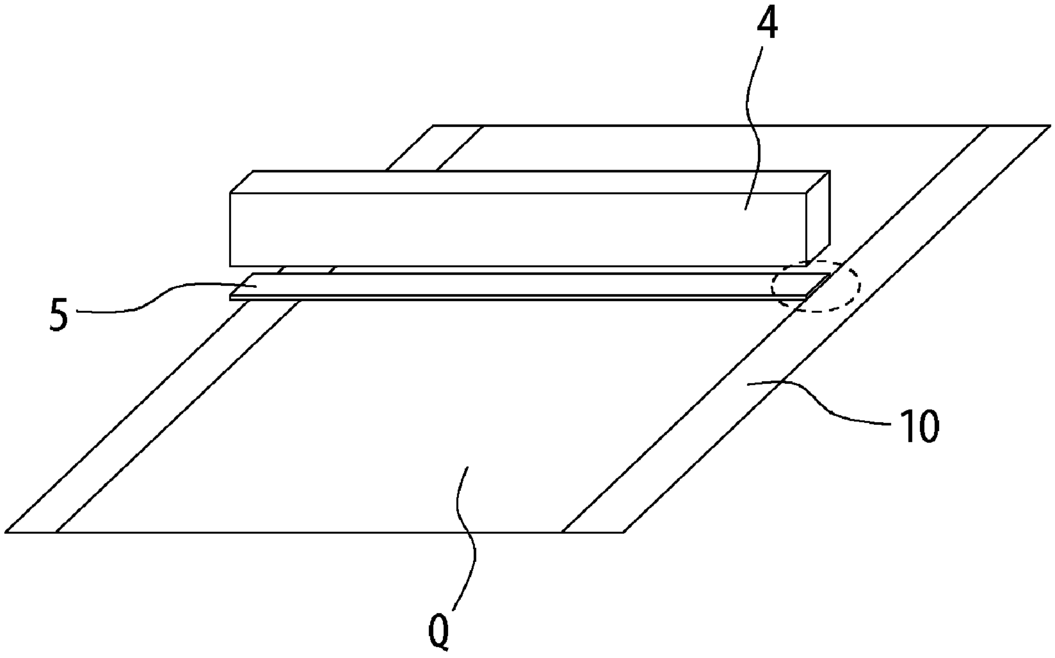
FIG. 3 is a diagram illustrating an arranging state of a belt conveying means, a first light emitting means and a light diffusing means constituting the detection apparatus.
Figure 4:
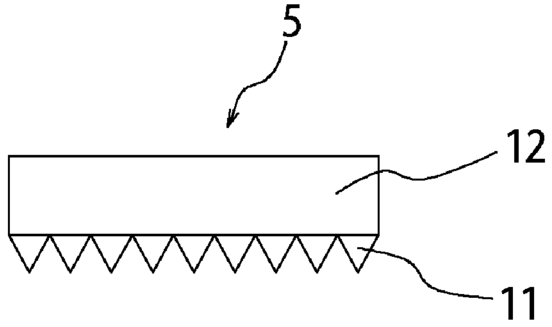
FIG. 4 is a diagram showing a concrete sectional shape of the light diffusing means.

FIG. 1 is a schematic side view of an apparatus for detecting colored foreign particles in quartz powder material according to the invention, and FIG. 2 is a partial enlarged view of a section surrounded by a dashed circle in the detection apparatus of FIG. 1. FIG. 3 is a diagram illustrating a positional relation among a belt conveying means, a first light emitting means and a light diffusing means constituting the detection apparatus, and FIG. 4 is a diagram showing a concrete sectional shape of the light diffusing means.

The detection apparatus 1 shown in FIG. 1 mainly comprises a material supplying means 2, a belt conveying means 3, a first light emitting means 4, a light diffusing means 5 and a color imaging means 6.

The material supplying means 2 is arranged in a material supplying zone I for continuously supplying white quartz powder material at a given rate. In FIG. 1, the material supplying means 2 comprises a material supplying hopper 7 storing charged quartz powder material temporarily and dropping a given amount of the quartz powder material downward, a material supplying tray 8 receiving the quartz powder material dropped from the material supplying hopper 7, and an oscillation feeder 9 oscillating the material supplying tray 8 to continuously supply the quartz powder material from the material supplying tray 8 to the belt conveying means 3 at a given rate.

The belt conveying means 3 has a horizontally and continuously extending constitution for conveying the quartz powder material from the material supplying zone I of the detection apparatus 1 provided with the material supplying means 2 through a foreign particle detecting zone II for detecting colored foreign particles contained in the quartz powder material and a foreign particle removing zone III for removing the colored foreign particles to a powder recovering zone IV for recovering quartz powder left after the removal of the colored foreign particles. Although the belt conveying means is constituted with an endless conveyor belt 10 in FIG. 1, the invention is not limited to such a constitution, and various embodiments can be adopted.

The surface color of the conveyor belt 10 is preferable to be white in a point that since the quartz powder material conveyed on the belt is white, colored foreign particles can be clearly distinguished in the detection using color images. Also, the detection apparatus 1 is preferable to further comprise a second light emitting means 18 for irradiating the quartz powder material conveyed on the conveyor belt 10 with light from the lower side of the conveyor belt 10. In this case, it is necessary that the conveyor belt 10 is made of light-transmissive material.

The first light emitting means 4 is located in the foreign particle detecting zone II above the belt conveying means 3 (more strictly, conveyor belt 10) for emitting light with a given wavelength. As the first light emitting means 4 are concretely mentioned a halogen lamp, a metal halide lamp, a mercury lamp, an LET lamp and so on. The light emitted from the light emitting means is more preferable to be visible light with a wavelength of 20 to 800 nm.

The light diffusing means 5 is located in the foreign particle detecting zone II beneath the first light emitting means 4 and above the belt conveying means 3 (more strictly, conveyor belt 10), and arranged for converting the light emitted from the first light emitting means 4 into scattering light to irradiate the quartz powder material Q conveyed on the belt conveying means as shown in FIG. 3. The light diffusing means 5 is not particularly limited as long as it has concretely a structure of converting the light emitted from the first light emitting means 4 into scattering light, but is preferable to be composed of a transparent plastic plate 12 provided at its bottom surface with a corrugated section 11 as shown, for example, in FIG. 4. The corrugated section 11 may be formed integrally by using the same material as the transparent plastic plate 12 or may be formed by attaching transparent diffusion tape provided with the corrugated section 11 onto the bottom surface of the transparent plastic plate 12.

Also, the light diffusing means 5 is preferable to be arranged just beneath the first light emitting means 4.

The color imaging means 6 is located in the foreign particle detecting zone II above the belt conveying means 3 (more strictly, conveyor belt 10) to continuously shoot color images of the quartz powder material Q. The color imaging means 6 can be concretely constituted with a CCD camera 13 shooting the quartz powder material Q conveyed on the conveyor belt 10, a control unit 14 processing the shot image as a color image and a monitor (not shown) displaying the color image processed by the control unit 14.

The detection apparatus 1 of the invention may further comprise the foreign particle removing zone III and the powder recovering zone IV as shown in FIG. 1.

For example, when colored foreign particles are detected by the control unit 14 constituting the color imaging means 6, as shown in FIG. 1, suction rollers 15, 16 for the removal of foreign particles, which are driven by commands from the control unit 14 and have a given slit, can be disposed in the foreign particle removing zone III so as to suck and remove the colored foreign particles on the conveyor belt 10. Moreover, quartz powder after the removal of the foreign particles can be recovered into a container 17 in the powder recovering zone IV by falling down from the conveyor belt 10.

As mentioned above, in the detection apparatus 1 of the invention, the quartz powder material Q is irradiated with the scattering light from the light diffusing means 5 to clarify the shading of color images shot by the color imaging means, whereby the colored foreign particles contained in the quartz powder material Q can be detected in a high precision.

Then, a silica crucible of a high quality is obtained by using quartz powder recovered after the colored foreign particles are detected and removed by the detection apparatus 1.

Generally, when particle size of quartz powder and particle size of colored foreign particles in the quartz powder material Q are different to each other, it is easy to distinguish one from the other. In the detection apparatus 1 of the invention, however, colored foreign particles can be detected in a high precision even when the particle sizes of both are approximately the same level. In particular, the detection apparatus 1 of the invention can detect light yellowish colored foreign particles such as iron-based refuse, organic refuse and carbon-based refuse in a high precision.

Moreover, the average particle size of each of quartz powder and colored foreign particles in the quartz powder material Q is preferable to be within a range of 20 to 1000 μm. When the average particle size is less than 20 μm, the detection with a high precision tends to become difficult in terms of resolution of the detection apparatus, while when it exceeds 1000 μm, the detection can be attained in a sufficient precision even by the conventional detection apparatus, and hence the remarkable effects by the detection apparatus of the invention cannot be developed.

Moreover, the detection apparatus 1 can further comprise means for detecting the colored foreign particles contained in the quartz powder material in which a monochrome image of the quartz powder material conveyed on the belt conveying means is shot with a differential interference microscope and a spatial filter is applied to the shot monochrome image to emphasize a section of changing luminance and thereafter the emphasized section is binarized to detect the colored foreign particles contained in the quartz powder material. In this detection means, the processing of the monochrome images can be conducted using images shot with the CCD camera constituting the color imaging means 6.

Next, the method for detecting colored foreign particles contained in quartz powder material according to the invention will be described below.

In the detection method of the invention, the quartz powder material continuously supplied from the material supplying means 2 at a given rate is conveyed and the conveyed quartz powder material Q is irradiated at least from above with scattering light converted from light with a given wavelength so as to continuously shoot color images of the quartz powder material with clarified shading, whereby colored foreign particles contained in the quartz powder material can be detected.

Although the above is described with respect to only one embodiment of the invention, various modifications may be made without departing from the scope of the appended claims.

EXAMPLE

Next, colored foreign particles contained in quartz powder material are detected using the detection apparatus of the invention, and the detection precision is evaluated.

In this example, colored foreign particles contained in quartz powder material (average particle size: 240 μm) are detected using the detection apparatus shown in FIG. 1 and the detected colored foreign particles are removed, and thereafter quartz powder after the removal is recovered.

For comparison, the same procedure as in Example is conducted using a detection apparatus having the same structure as in FIG. 1 except that the light diffusing means is not disposed (Comparative Example).

As a result, Example is less in the erroneous detection due to shading of quartz powder and excellent in the precision for detecting colored foreign particles as compared with Comparative Example.

According to the invention, it is possible to detect colored foreign particles in a high precision even when pale colored foreign particles such as iron-based refuse, organic refuse and carbon-based refuse are contained in quartz powder material.

What is claimed is:

1. An apparatus for detecting colored foreign particles in quartz powder material comprising:

a material supplying means for continuously supplying white quartz powder material having polygonal external surfaces at a given rate;

a belt conveying means for conveying the quartz powder material continuously supplied from the material supplying means;

a first light emitting means located above the belt conveying means and emitting light with a given wavelength;

a light diffusing means located below the first light emitting means and above the belt conveying means and converting the light emitted from the first light emitting means into scattering light to irradiate the quartz powder material conveyed on the belt conveying means; and a color imaging means located above the belt conveying means and continuously shooting color images of the quartz powder material, wherein the quartz powder material is irradiated with the scattering light from the light diffusing means to clarify shading of color images shot by the color imaging means to thereby detect colored foreign particles contained in the quartz powder material, and the apparatus further comprising a means for improving a detection precision of colored foreign particles that a monochrome image of the quartz powder material conveyed on the belt conveying means is shot with a differential interference microscope and a spatial filter is applied to the shot monochrome image to emphasize a section of changing luminance and the emphasized section is binarized to detect colored foreign particles contained in the quartz powder material.

2. The apparatus for detecting colored foreign particles in quartz powder material according to claim 1, wherein the light diffusing means comprises a transparent plastic plate having a corrugated bottom surface.

3. The apparatus for detecting colored foreign particles in quartz powder material according to claim 1, wherein the light emitted from the light emitting means is visible light having a wavelength of 20 to 800 nm.

4. The apparatus for detecting colored foreign particles in quartz powder material according to claim 1, wherein the belt conveying means is made from a white light-transmissive material.

5. The apparatus for detecting colored foreign particles in quartz powder material according to claim 1, further comprising a second light emitting means for irradiating the quartz powder material conveyed on the belt conveying means with light from the lower side of the belt conveying means.

6. The apparatus for detecting colored foreign particles in quartz powder material according to claim 1, wherein quartz powder in the quartz powder material has an average particle size of 20 to 1000 μm.

7. The apparatus for detecting colored foreign particles in quartz powder material according to claim 1, wherein the colored foreign particles in the quartz powder material are pale colored foreign particles such as iron-based refuse, organic refuse and carbon-based refuse.

8. The apparatus for detecting colored foreign particles in quartz powder material according to claim 1, wherein the foreign particles in the quartz powder material have an average particle size of 20 to 1000 μm.

9. A method for detecting colored foreign particles in quartz powder material, using an apparatus according to claim 1, which comprises conveying white quartz powder material having polygonal external surfaces, irradiating the conveyed quartz powder material at least from above thereof with scattering light converted from light of a given wavelength and continuously shooting color images of the quartz powder material with clarified shading to thereby detect colored foreign particles contained in the quartz powder material.

* * * * *